Aug. 12, 1969  L. G. LILLY  3,461,346

PORTABLE TRANSISTORIZED ELECTRO-LUMINESCENT NIGHT LIGHT

Filed Dec. 27, 1966

INVENTOR
LESLIE G. LILLY

BY Whittemore, Hulbert
& Belknap
ATTORNEY

United States Patent Office 3,461,346
Patented Aug. 12, 1969

3,461,346
PORTABLE TRANSISTORIZED ELECTRO-LUMINESCENT NIGHT LIGHT
Leslie G. Lilly, 4134 McDougall Ave.,
Detroit, Mich. 48207
Filed Dec. 27, 1966, Ser. No. 604,863
Int. Cl. H05b 41/16
U.S. Cl. 315—276         5 Claims

ABSTRACT OF THE DISCLOSURE

A portable transistorized electro-luminescent night light is disclosed. The night light features a battery operated transistor oscillator for converting direct current to alternating current which oscillator is transformer coupled to an electro-luminescent panel. Switch means are provided for actuating the night light along with a variable resistor for varying the power applied to the electro-luminescent panel to give a desired light intensity. A neon light stray signal arrester is also included in the disclosure.

---

Night lights for providing a low level of illumination to permit distinguishing of objects at night, allowing safe movement without being bright enough to disturb sleep, have been known in the past. However, prior night lights have not usually been portable so that their use in different rooms and in locations where most desirable has been limited.

Wherein night lights have in the past been portable, the illuminating members have usually been energized by direct electric energy and have created a relatively high energy drain. In addition, prior known portable night lights have often been complicated, expensive, and inefficient.

It is therefore an object of the present invention to provide an improved night light.

Another object is to provide a night light as set forth above which is portable.

Another object is to provide a night light as set forth above wherein the illuminating member is energized by alternating electric energy.

Another object is to provide a night light as set forth above wherein the illuminating member is an electro-luminescent panel.

Another object is to provide a night light as set forth above wherein the illuminating member is energized by a transistorized oscillator.

Another object is to provide a portable night light which is simple in construction, economical to manufacture and efficient in use.

These and other objects will become more apparent as the description proceeds, especially when taken in conjunction with the accompanying drawings, wherein.

Figure 1:
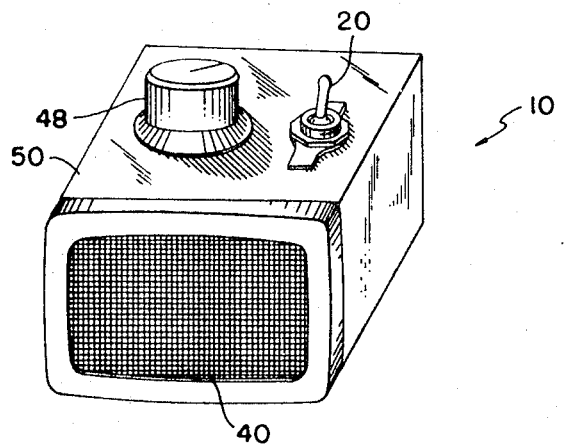
FIGURE 1 is a perspective view of a portable night light constructed in accordance with the invention.

With particular reference to the figures of the drawing, one embodiment of the present invention will now be considered in detail.

Figure 2:
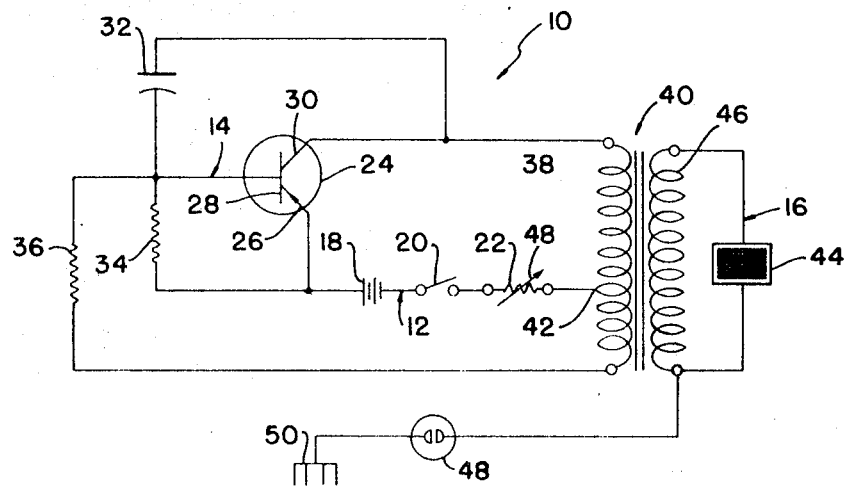
FIGURE 2 is a schematic diagram of the portable night light illustrated in FIGURE 1.

As shown best in FIGURE 2, the portable night light 10 includes the source of direct electric energy 12, the means for converting the direct electric energy to alternating electric energy 14 and the means for providing light in response to the alternating electric energy 16.

In operation when the night light 10 is turned on, direct electric energy from the direct electric energy source 12 is converted to alternating electric energy by the means for converting direct electric energy to alternating electric energy 14. The alternating electric energy is then utilized to energize the means for providing light 16. As will be evident, the night light 10 is completely portable.

More specifically, the source of direct electric energy 12 may be two pen light batteries connected in series each of which provides one and one-half volts. A direct electric energy source battery 18 of three volts is thus provided. The on-off switch 20 and the variable resistor 22 as shown are connected in series with each other and with the battery 18 in the source of direct electric energy 12.

As indicated the source of direct electric energy 12 provides a three volt direct electric energy signal to energize the means for converting direct electric energy to alternating electric energy 14 when the on-off switch 20 is closed. With the on-off switch 20 open, the source of direct electric energy 12 is effectively disconnected from the means 14 for converting the direct electric energy to alternating electric energy.

The variable resistor 22 is provided to vary the level of direct electric energy connected to the means for converting direct electric energy to alternating electric energy 14, whereby the output level of the alternating electric energy and consequently the intensity of light provided by the means for providing light 16 may be varied.

The means for converting direct electric energy to alternating electric energy 14 as shown includes the transistor 24 having the emitter base and collector electrodes 26, 28 and 30, respectively, connected in an oscillator configuration. Thus a feedback capacitor 32 is provided between the collector electrode 30 and the base electrode 28. A relatively small resistance 34 is provided to connect the emitter electrode 26 to the base electrode 28 and a relatively large resistance 36 is connected in series with the primary winding 38 of a transformer 40 between the collector electrode 30 and the base electrode 28. The source of direct electric energy 12 including the battery 18, the on-off switch 20, and variable resistor 22 is connected between the emitter electrode 26 and the point 42 on the primary winding 38 of the transformer 40.

In operation when the on-off switch 20 is closed the transistor oscillator 24 is energized from the source of direct electric energy 12 to produce an alternating electric signal across the primary winding 38 of transformer 40. The signal level across the primary winding of the transformer 40 will depend on the setting of the variable resistor 22 in the source of direct electric energy.

The means for providing light 16 includes an electro-luminescent light panel 44 connected across the secondary winding 46 of the transformer 40. A neon light 48 which acts as a stray alternating signal arrester in connected between ground 50 at one side and between the light panel 44 and the secondary winding 46 of the transformer 40 on the other side, as shown.

Electro-luminescent panels 44 are known in the art and are obtainable for example from the General Electric Company and the Sylvania Corporation. They will not therefore be considered in detail herein except to state that these panels have the property of producing light when connected across alternating electric energy, such as provided by the secondary winding 46 of the transformer 40 with the transformer energized.

In overall operation, when it is not desired to use the night light 10, the on-off switch 20 is open. At this time there will be no energy drain from the battery 18 and the electro-luminescent panel 44 will not be energized. When it is desired to use the night light 10, it is placed in a desired location and the on-off switch 20 is closed. The transistorized oscillator 24 is thus energized to provide an alternating electric energy signal across the transformer 40. The electro-luminescent panel 44 is thus energized to provide the desired light. The intensity of the light from the electro-luminescent panel 44 is then set by operation of the variable resistor 22. Stray alternating electric energy signals are returned to ground through the neon tube 48.

As shown in FIGURE 1 the portable night light 10 may be housed in a box 50 which may be constructed of suitable material, such as metal or plastic. One side of the box 50 is the electro-luminescent panel 44. The variable resistor 22 is controlled by varying the control knob 48 positioned for convenience on top of the box 50 beside the toggle switch 20 which it will be recognized is the on-off switch of FIGURE 2. The remainder of the electronic components of the schematic diagram of FIGURE 2 may be conveniently arranged within the box 50 on for example an isolating board if desired.

It will thus be seen that in accordance with the invention, there is provided a portable transistorized electro-luminescent night light. Further it will be recognized that the provided night light is simple in construction, whereby it will be economical to manufacture and efficient in use.

While one embodiment of the present invention has been considered in detail, it will be understood that other embodiments and modifications are contemplated by the inventor. It is therefore the intention to include all embodiments and modifications as are defined by the appended claims within the scope of the invention.

What I claim as my invention is:

1. A night light comprising a semi-conductor having emitter, base and collector electrodes, a feedback capacitor connected directly between the collector and base electrodes, a resistor connected directly between the emitter and base electrodes, a transformer having a center tapped primary winding and a secondary winding one end of the primary winding of the transformer being connected directly to the collector electrode the other end of the primary winding being connected through a resistor directly to the base electrode, a source of direct current electric energy connected between the emitter electrode and the center tap of the primary transformer winding and an electro-luminescent panel connected directly to the opposite ends of the secondary winding of the transformer.

2. Structure as set forth in claim 1 and further including an on-off switch connected between the source of direct current electric energy and the center tap of the primary winding of the transformer.

3. Structure as set forth in claim 1 and further including a variable resistor connected between the source of direct current electric energy and the center tap of the primary winding of the transformer for varying the intensity of the night light.

4. Structure as set forth in claim 1 and further including a neon light connected between one end of the secondary winding of the transformer and ground for arresting stray alternating current signals.

5. A night light comprising a rectangular container one side of which is formed by an electro-luminescent panel, an electrical circuit positioned within the container including a transistor having emitter, base and collector electrodes, a feedback capacitor connected directly between the collector and base electrodes, a resistor connected directly between the emitter and base electrodes, a transformer having a center tapped primary winding and a secondary winding, one end of the primary winding of the transformer being connected directly to the collector electrode the other end of the primary winding of the transformer being connected to the base electrode through a resistor, a source of direct current electric energy connected between the emitter electrode and the center tap of the transformer primary winding, an on-off switch and a variable resistor connected in series and positioned on top of the container connected between the source of electrical energy and the center tap of the transformer primary winding, the electro-luminescent panel being directly connected to the opposite ends of the secondary winding of the transformer and a neon light stray alternating signal arrester connected between one end of the secondary winding of the transformer and ground.

References Cited

UNITED STATES PATENTS

| 2,904,755 | 9/1959 | Foley | 331—112 |
| 2,982,881 | 5/1961 | Reich | 331—112 |
| 3,083,317 | 3/1963 | Fish et al. | 313—108 X |
| 3,144,992 | 8/1964 | Cheung | 240—6.4 |
| 3,153,745 | 10/1964 | Gurian et al. | |
| 3,351,347 | 11/1967 | Smith et al. | 313—108 X |

FOREIGN PATENTS

| 586,501 | 11/1959 | Canada. |
| 1,142,181 | 9/1957 | France. |

JAMES W. LAWRENCE, Primary Examiner
R. F. HOSSFELD, Assistant Examiner

U.S. Cl. X.R.
240—6; 313—108; 315—33